Patented Feb. 14, 1928.

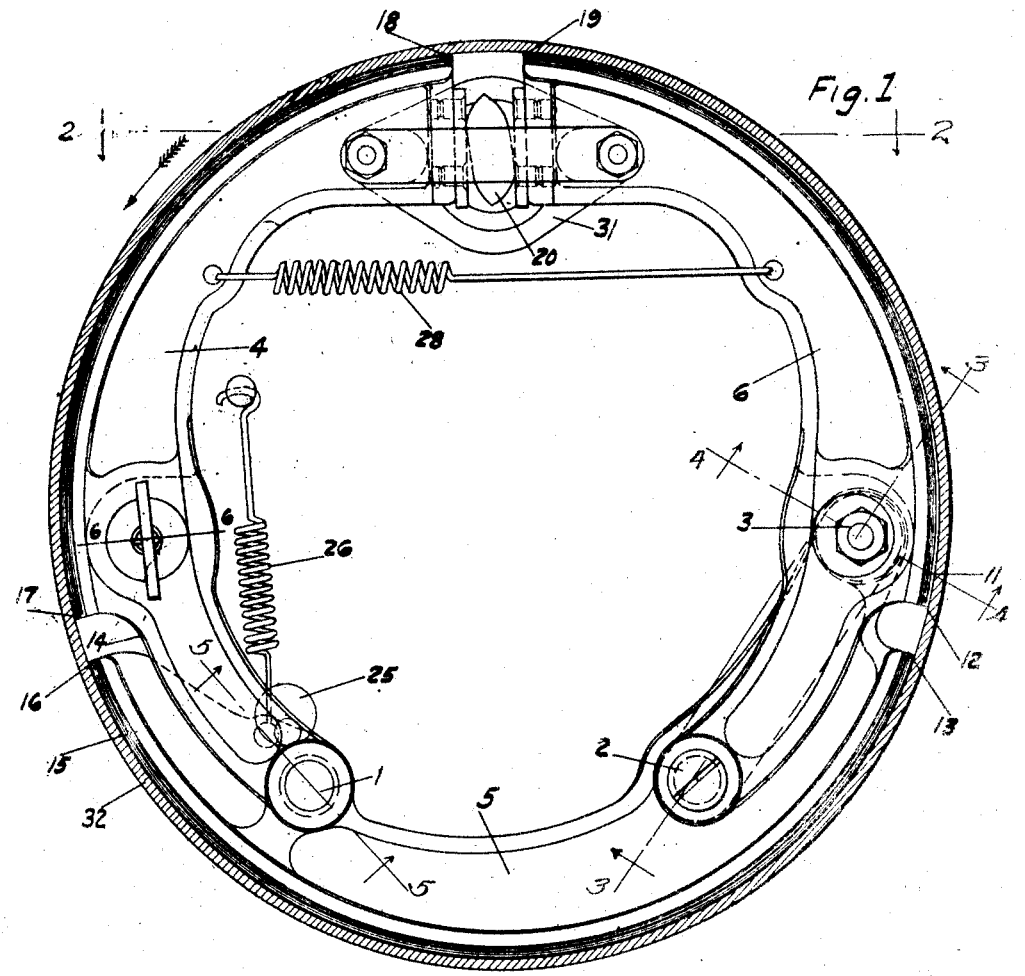

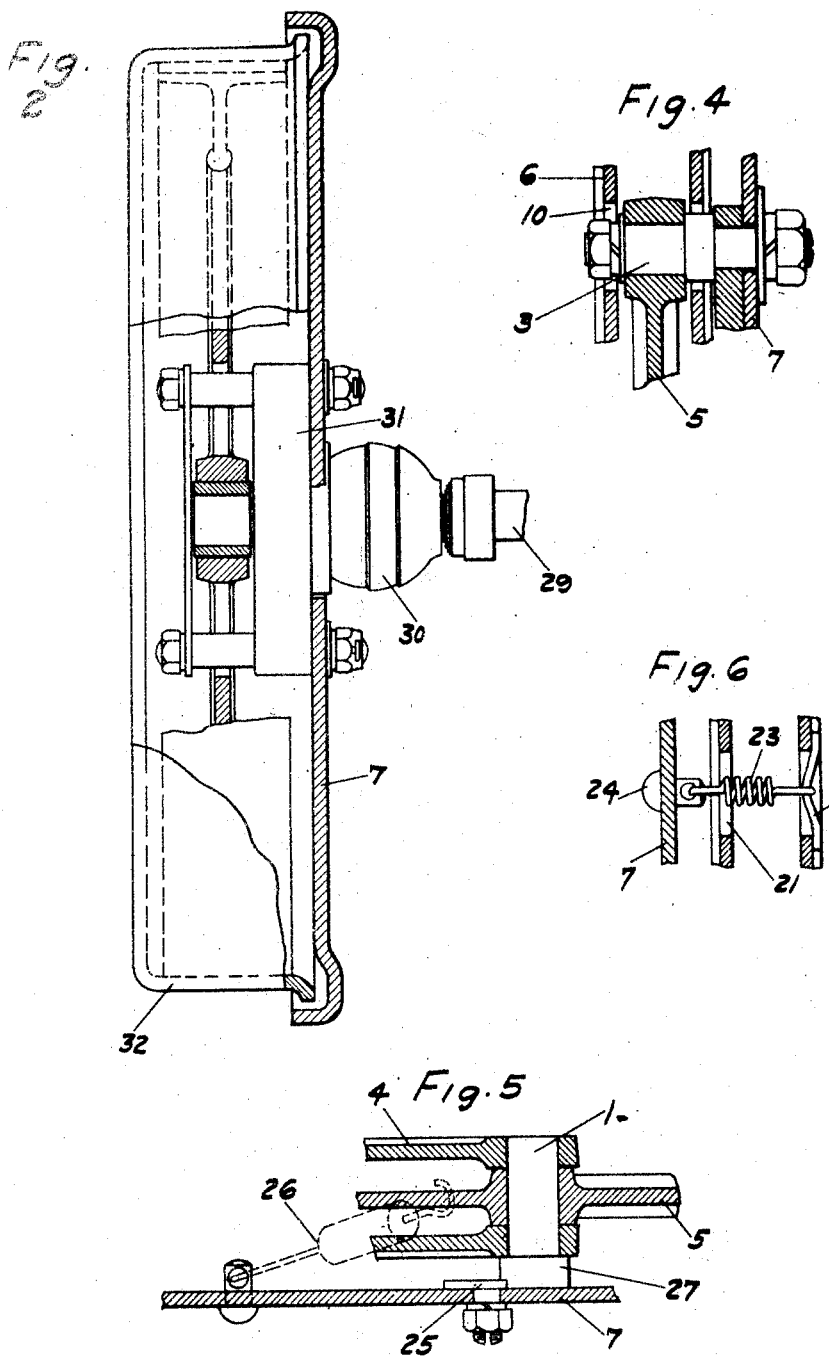

1,659,545

UNITED STATES PATENT OFFICE.

ADIEL Y. DODGE, OF SOUTH BEND, INDIANA, ASSIGNOR TO BENDIX BRAKE COMPANY, OF CHICAGO, ILLINOIS, A CORPORATION OF ILLINOIS.

WHEEL BRAKE.

Application filed December 2, 1924. Serial No. 753,520.

This invention relates to brakes especially adapted for moving vehicles, particularly, of the automotive type and has for its principal object the improvement in the construction and arrangement of brakes of the internal expanding type.

My invention has a further object to improve the arrangement and operating characteristics of brakes of the self energizing type, wherein one shoe of the self energizing brake is acted on by another shoe constituting a part of the self energizing brake.

It is a further object of my invention to provide a construction and arrangement of a self energizing brake and an independent brake such as shown in my co-pending application, Serial No. 723,836 filed July 2, 1924.

It is a further object of my invention to obtain a braking mechanism having a plurality of brake shoes in which at least two of the shoes are substantially identical and interchangeable thereby reducing the number of different brake shoes and hence the cost of construction.

These and other objects will be apparent from a study of the specification taken in connection with the annexed drawings wherein, Figure 1 is a side elevation showing three brake shoes forming a complete braking mechanism, the shoes being shown in engagement with a rotating drum.

Figure 2 is a side elevation of Fig. 1 showing one form of brake operating means.

Figure 3 is a fragmentary plan and sectional view of the brake shoes showing the joint 2.

Figure 4 is a fragmentary plan and sectional view taken at the joint 3.

Figure 5 is a fragmentary plan and sectional view taken at the joint 1, while

Figure 6 is a fragmentary sectional view on the lines 6—6 of Fig. 1.

Referring now to the details wherein like numbers refer to corresponding parts in their various views, 32 is a brake drum within which is positioned, for engagement therewith, a braking mechanism comprising a self energizing brake made up of a primary shoe 4 and a secondary shoe 5 articulated or jointed at 1 as more clearly shown in Fig. 5. An independent shoe 6 is anchored or pivoted by the pivot pin 2 to a stationary member such as a cover plate 7 that also serves to close the opening of the brake drum 32. The secondary shoe 5 is also anchored by a pin 3 to the cover plate 7. The brake shoes 4 and 6 are constructed substantially identical so that they are interchangeable in position thereby reducing the actual number of shoes to be manufactured to two, although the shoe 6 is used as an independent one, while the shoe 4 is a part of the self energizing brake comprising the shoes 4 and 5. It is to be understood that the shoes 4, 5, and 6 may be of any desired cross section, but in order to illustrate my invention I have chosen to show shoes 4 and 6 as substantially T shaped beginning at the actuating ends and terminating in bifurcated portions toward the pivots 1 and 2, as shown in Fig. 3, while the shoe 5 is preferably T shaped throughout its length. As will be seen in Fig. 3, the stem 8 of the shoe 5 passes between the flanges of the channel shaped shoe 6 and is provided with a clearance hole 9, around the pivot stud 2 of the brake shoe 6. Similarly, the flanges of the brake shoe 6 has the clearance holes 10 for the pivot stud 3 of the shoe 5. The advantages of overlapping anchor points for the independent shoe 6 and the secondary shoe 5 have been clearly pointed out in my co-pending application previously referred to so that it is not deemed necessary to go into these details in this application, except, to emphasize that this construction allows the heels of the shoes 5 and 6 carrying the friction material 11, to be brought very closely together as indicated by the points 12 and 13; however, a further advantage is derived, from my present construction, by cutting away the web of the shoe 4 as indicated at 14, thereby allowing the flange 15, of the shoe 5, to extend a considerable distance beyond the articulated joint 1 bringing the points 16 and 17 of the shoes 4 and 5 very close together and since the points 18 and 19 adjacent the brake operating means 20, which is shown in the form of a cam, are relatively close together, the entire braking surface is made a maximum, it being only a few degrees short of a full circumference. The brake shoe 4, has a clearance hole 21, in which is positioned a holding device comprising a disc 22 and a spring 23 fastened to the plate 7 by a member 24. The clearance hole 21 corresponds to the hole 10 as shown in brake shoe 6, the hole thus being used in the case of brake shoe 4 for positioning an antirattling device and in the case of brake shoe 6, as a clearance for anchor stud 3. The articulated joint 1 is adapted to be acted on by an adjustable device 25 whereby the joint 1 of the brake shoe 5 may be adjusted outside the drum with respect to the drum. A spring 26 is utilized to return the shoe 5 to normal position after the brake operating means has been released. As shown in Fig. 5, the spring 26 is preferably set at an angle thereby holding the head 27 of the pivot stud 1 against the backing or cover plate 7. A spring 28 acts between the shoes 4 and 6 to restore them to normal position after being acted on by some actuating means such as a cam 20 that is adapted to be operated by a shaft 29 acting through a universal joint 30 carried on the plate 7 by a suitable bracket 31.

While I have shown a mechanical arrangement for actuating the brakes, it is to be understood that it may be actuated by any other actuating means, and it is to be further understood that the details for carrying my invention into practice may be modified to considerable extent without departing from the spirit of my invention or the scope of the appended claims.

Having thus described my invention what I claim is:

1. In brake mechanism for engaging a rotatable drum, a self energizing unit composed of articulated primary and secondary shoes, an independent shoe and means for causing all shoes to engage said drum, said primary and independent shoes being similar and inter-changeable for the purposes described and different from the secondary shoe.

2. In brake mechanism for engaging a rotatable drum, a self energizing unit composed of articulated primary and secondary shoes, an independent shoe and means for causing all shoes to engage said drum, one of said shoes of the self energizing unit being inter-changeable with said independent shoe and the other not being interchangeable.

3. In brake mechanism for engaging a rotatable member, three brake shoes with means for causing said shoes to engage the rotatable member, two of said shoes being similar and inter-changeable and overlapping opposite ends of the third shoe in combination with torque-taking means engaging the third shoe and one of the two interchangeable shoes.

4. In brake mechanism for engaging a rotatable member, three brake shoes with means for causing said shoes to engage the rotatable member, two of said shoes being similar and inter-changeable and disposed at opposite ends of the third shoe, one of said two shoes being pivoted to the third shoe while one end of the other of said two shoes is pivoted to a stationary member.

5. In brake mechanism for engaging a rotatable member, three brake shoes, two of which are similar and interchangeable, means for acting on one end of each of said two shoes to move them into engagement with said rotatable member, said third shoe being anchored and being disposed between said two shoes and actuated by at least one of them.

6. In brake mechanism for engaging a rotatable member, three brake shoes, two of which are similar and interchangeable, means for acting on one end of each of said two shoes to move them into engagement with said rotatable member, said third shoe being disposed between said two shoes, and having one end pivoted by a relatively movable anchorage to one end of one of said two shoes while the other end of the third shoe and of the second of said two shoes, have fixed pivots arranged in over-lapping relationship.

7. In brake mechanism for engaging a rotatable drum, a pair of brake units, at least one of which is composed of a plurality of articulated shoes, and means for causing said units to engage the drum, one unit being similar and interchangeable with a part only of the other unit.

8. In brake mechanism for engaging a rotatable drum, a self energizing unit composed of articulated primary and secondary shoes, an independent shoe and means for causing all shoes to engage said drum, said secondary shoe having its braking surface extending beyond the articulated joint toward the heel of the primary shoe.

9. In brake mechanism for engaging a rotatable drum, a self energizing unit composed of articulated, primary and secondary shoes, an independent shoe and means for causing all shoes to engage said drum, said secondary shoe and the independent shoe having overlapping anchor points and the secondary shoe having its toe extending some distance beyond the articulated joint and overlapping the pivot of the primary shoe.

10. In brake mechanism for engaging a rotatable member, means for increasing the effectiveness of said mechanism comprising a plurality of shoes, one of which has its braking surface extending over the heel pivot portions of the two shoes adjacent its ends and being actuated by at least one of said two shoes.

11. In brake mechanism for engaging a rotatable member, a self energizing unit, an independent shoe, means for causing all shoes to engage said rotatable member, one portion of the self energizing unit having a part extending over the pivot end of the other portion and another part also extending over the pivot portion of the independent shoe.

12. In brake mechanism for engaging a rotatable drum, a self energizing unit composed of articulated primary and secondary shoes, an independent shoe and means for causing all shoes to engage said drum, said primary shoe and independent shoe being channel shaped at least at one end in cross section while the secondary shoe is T shaped in cross section.

13. In brake mechanism for engaging a rotatable drum, a self energizing unit composed of articulated, primary and secondary shoes, an independent shoe and means for causing all shoes to engage said drum, said primary shoe and independent shoe being channel shaped at least at one end in cross section and interchangeable, while said secondary shoe is T shaped in cross section.

14. In brake mechanism for engaging a rotatable drum, a self energizing unit composed of articulated, primary and secondary shoes, an independent shoe and means for causing all shoes to engage said drum, said primary shoe and independent shoe being preferably T shaped from its actuating end and terminating in bifurcated portions toward their pivots while the secondary shoe is preferably T shaped in cross section throughout its length.

15. A brake including an anchored central shoe, and a pair of end shoes arranged at opposite ends of the central shoe, at least one of the end shoes being pivoted to the central shoe between its ends.

16. A brake including a backing plate, a central shoe, a pair of end shoes overlapping opposite ends of the central shoe, a pivot for connecting one of the end shoes to the central shoe and which has a head slidably engaging the backing plate, and a positioning stop carried by the backing plate and engaging said head of the pivot.

17. A brake including an anchored central shoe and a pair of forked end shoes straddling the end parts of the central shoe, and applying means acting on the end shoes and on the central shoe through one of the end shoes.

18. A brake including a central shoe and end shoes each having an opening in its web, an anchor for the central shoe passing through one opening, a steadying spring for the other end shoe, and a part holding the spring and bridging across the opening in said other shoe.

19. A brake comprising a shoe with spaced web parts formed with opposite openings, a part crossing the outer opening, and a steadying spring passing through said openings and secured to said part.

20. A brake comprising a shoe with a web formed with an opening, a part crossing the opening, and a steadying spring passing through said opening and secured to said part.

21. A brake including a secondary shoe anchored at one end, and a primary shoe connected to the secondary shoe some distance from its free end, so that said free end overhangs the connection.

22. A brake including a secondary shoe, a primary shoe connected to the secondary shoe some distance from one end, so that said end overhangs the connection, and a spring arranged to hold the secondary shoe yieldingly in idle position in such a manner that the primary shoe first swings about the connection and then overcomes the spring and applies the secondary shoe.

23. A brake including an anchored shoe, an end shoe, a pivot connecting the adjacent ends of said shoes, a stop adjacent said pivot, and a spring urging the pivot against the stop when the brake is released and overcome in applying the brake by movement of said end shoe.

24. A brake including an anchored shoe, an end shoe, a pivot connecting the adjacent ends of said shoes, an adjustable eccentric adjacent said pivot, and a spring urging the pivot against the eccentric when the brake is released and overcome in applying the brake by movement of said end shoe.

25. A brake including a backing plate, a pair of shoes arranged end to end, and a pivot connecting said shoes and having one end slidably engaging the backing plate to serve as a steady rest for the shoes.

In testimony whereof, I affix my signature.

ADIEL Y. DODGE.